Figure 1:
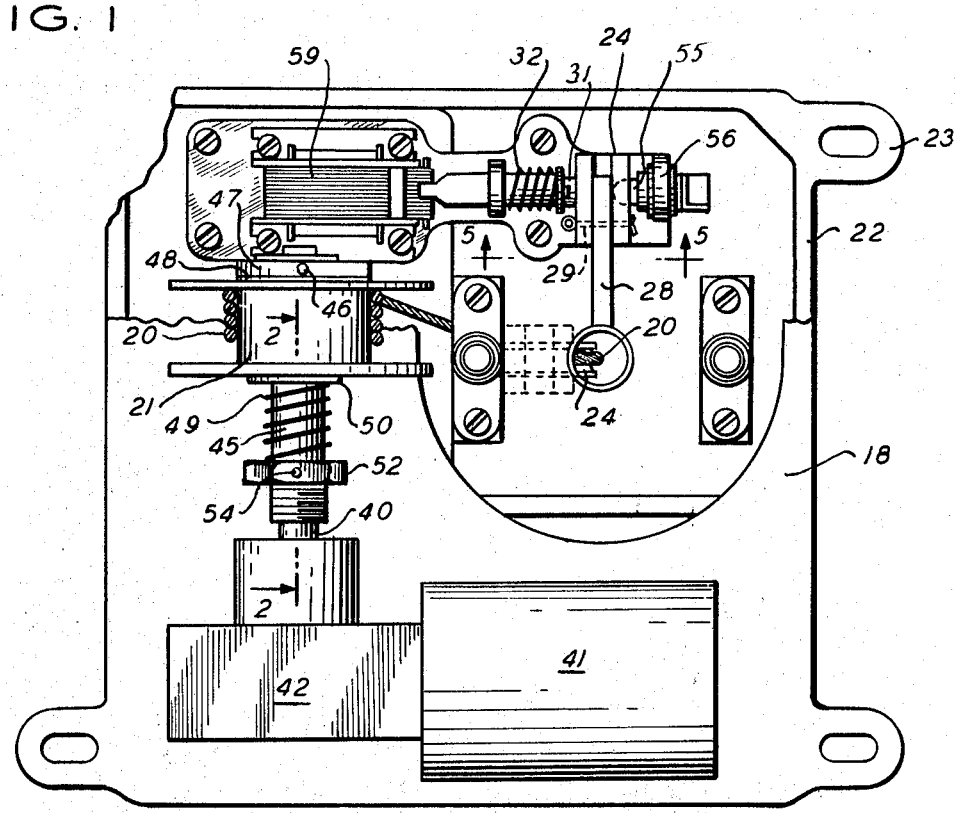

INVENTOR
H. C. PFAFF JR.
F. G. SCHLOSSER
BY
ATTORNEY

Jan. 31, 1967  H. C. PFAFF, JR., ETAL  3,301,533
CONTROL MEANS FOR LOWERING DEVICE CABLES

Filed Aug. 27, 1965  3 Sheets-Sheet 2

INVENTOR
H. C. PFAFF, JR.
F. G. SCHLOSSER

BY

ATTORNEY

INVENTOR
H. C. PFAFF, JR.
F. G. SCHLOSSER
BY
ATTORNEY

United States Patent Office 3,301,533
Patented Jan. 31, 1967

3,301,533
CONTROL MEANS FOR LOWERING
DEVICE CABLES
Henry C. Pfaff, Jr., Summit, and Francis G. Schlosser, Ridgefield Park, N.J., assignors to Pfaff and Kendall, Newark, N.J., a corporation of New Jersey
Filed Aug. 27, 1965, Ser. No. 483,255
3 Claims. (Cl. 254—174)

This invention relates to a lowering mechanism for elevating and lowering devices wherein cables are moved to predetermined elevated position and are registered at such positions for normal operation, and are lowered so that, for example, lighting units attached to cables may be repaired or replaced. Pursuant to the invention, novel means are provided for holding the drum on which the cable is entrained against rotation or non rotation of the motor driven shaft to which the drum is secured. Free movement of the cable in its various stages of movement is thus prevented. Pursuant to this invention, novel means are provided for interengagement of latch members, one carried by the cable, the other mounted at a fixed point, on elevation of the cable to the predetermined point and for disengagement of the latch members simultaneously with rotation of the drum shaft, for lowering the cable. A further feature of the invention is the provision of means for simultaneously discontinuing rotation of the drum shaft on engagement of the latch members and for holding the drum shaft against free rotation independently of the drum shaft, thus assuring precise registration of the parts in the various stages of operation thereof.

The drawings, illustrating procedures and devices useful in carrying out the invention, and the description below, are exemplary only of the invention, which shall be deemed to cover all other devices and procedures coming within the scope and purview of the appended claims.

Figure 2:
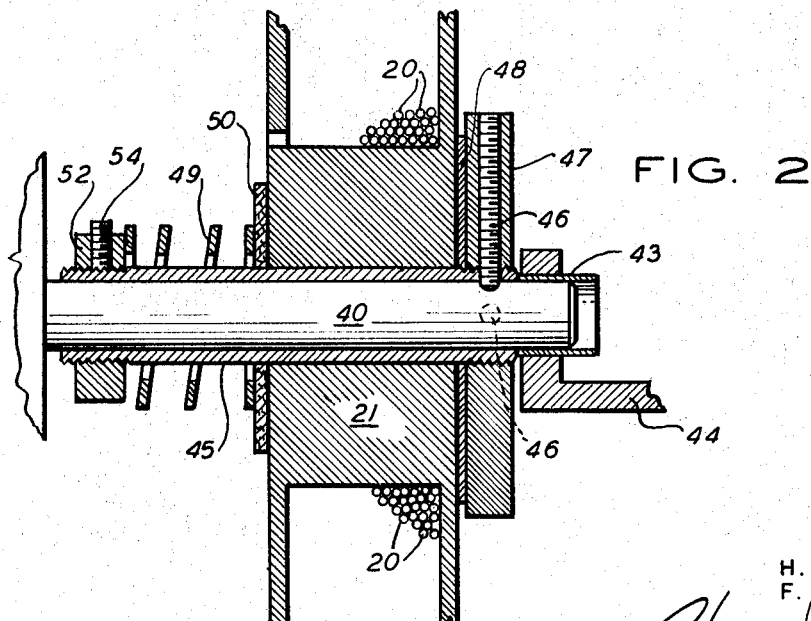
Figure 3:
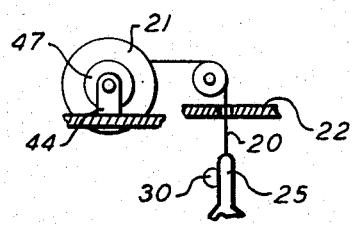
Figure 4:
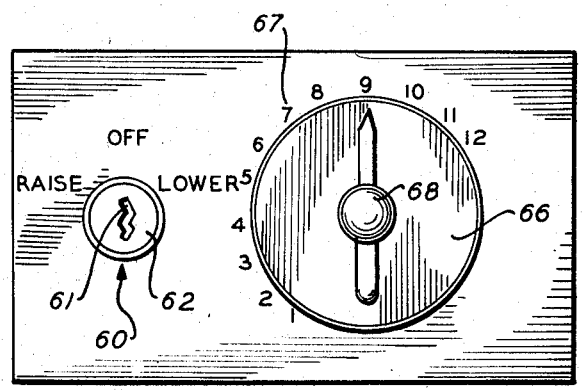
Figure 5:
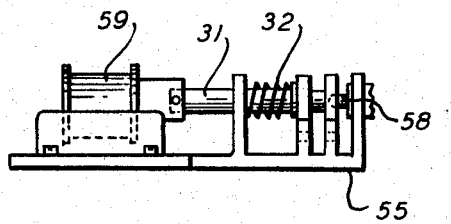
Figure 6:
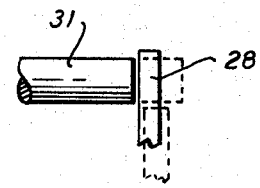
Figure 7:
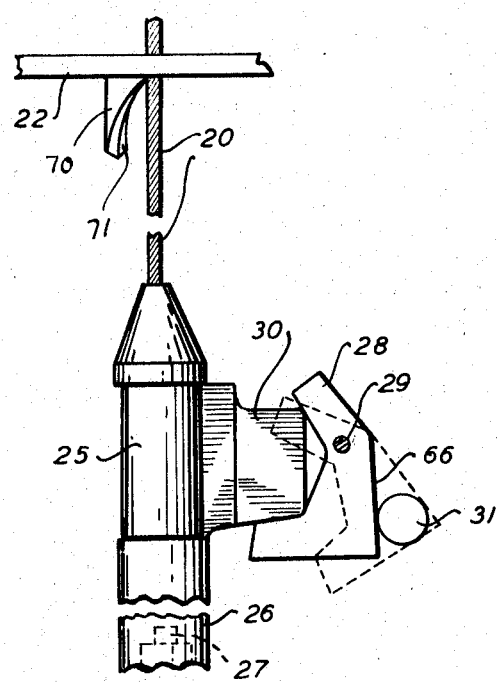
Figure 8:
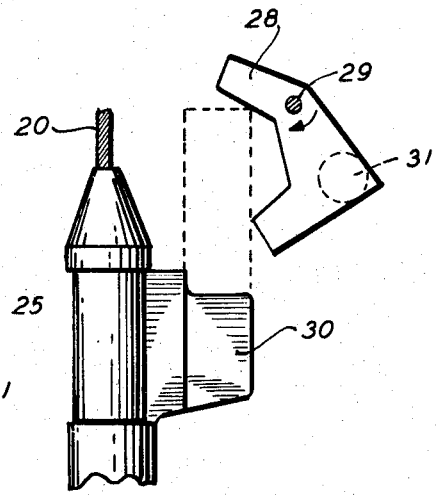
Figure 9:
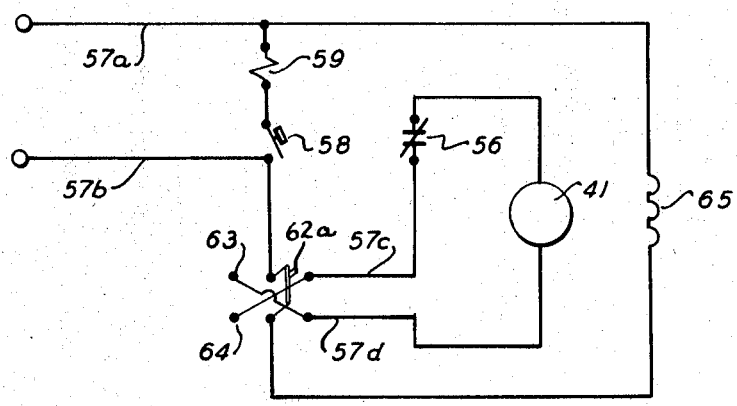

In the drawings, wherein similar reference characters indicate like parts:

FIG. 1 is a fragmentary top plan view of control means for cable lowering mechanisms of this invention, FIG. 2 is an enlarged, fragmentary, longitudinal sectional view, taken at lines 2—2 of FIG. 1, FIG. 3 is a schematic elevational view, showing the relationship of the parts of the device, FIG. 4 is a front elevational view of a control panel which may be used in connection with the invention, FIG. 5 is a fragmentary elevational view, taken at line 5—5 of FIG. 1, FIG. 6 is a fragmentary elevational view of parts of the latching mechanism, FIG. 7 is a fragmentary elevational view, showing the cable and the complementary latch member carried thereby engaged with the first latch member, which is further held in engaged position by rod member 31, pursuant to the invention, FIG. 8 is a similar, fragmentary view, showing the latch members disengaged, and FIG. 9 is a wiring diagram of a circuit which may be used in carrying out the invention.

As shown in the drawings, this invention is designed for control of movement of a cable 20 entrained (FIG. 1) on a drum 21, mounted on a casing 22, which may be supported from a ceiling, or other support by bolts or the like passing through lugs 23. The cable 20 may pass from the drum 21 onto a pulley 24, FIG. 1, and through an opening in the casing, the cable (FIGS. 7 and 3) having secured to the lower end thereof any member to be moved thereby, such as, for example, spindle 25 of casing 26 (FIG. 7) carrying electric lights and light contact 27 which, in the uppermost position of the cable (FIG. 7) would be in contact with complementary light contacts of casing 22 or otherwise disposed for engagement with the contact 27, as will be readily apparent to those skilled in this art.

A first latch member 28 (FIGS. 7 and 8) is movably mounted, as for example, on pivot pin 29 which may (FIG. 1) be mounted on casing 22; in the uppermost position of the cable 20 (FIG. 7), a complementary latch member 30 on spindle 25 will have rotated the first latch member into engagement therewith, rod 31 being normally urged (as by the spring 32, FIG. 1) to registration with edge of the first latch member 28, holding it engaged until withdrawal of rod 31, as below described.

The drum 21 is (FIG. 2) axially and movably mounted on drive shaft 40, which may be powered by any suitable electrical means such as a motor 41 (FIG. 1) which, actuates shaft 40 directly keyed to the armature or indirectly keyed thereto as through a gear box 42, or the like.

A friction disc 48 is secured to or positioned on (or formed unitary with) one face of back up plate 47 secured as at 46 to shaft 40 adjacent one end thereof. Adjustable pressure means such as a spring 49 (FIG. 2) press at one end against a slip or other minimal friction disc 50 (FIG. 2) pressing the drum 21 against the friction disc 48. The other end of the spring bears against an adjusting collar 52 which may be threadedly moved along shaft 40 or along a tube 45 keyed to the shaft, collar 52 being secured to the tube 45 at the desired position to thus correspondingly adjust the tension exerted by spring 49 on disc 50 by a lock member 54 (FIG. 2). Drive shaft 40 may (FIG. 2) have a free end extending beyond the backup plate 47, and rotatably journalled in bearing 43 in a supporting casing 44. Rod 31 is urged by spring 32 to normally (FIG. 7) register against an edge of first latch member 28 and (FIG. 1) against a stud 55 or operating plunger of a normally closed switch 56 to thus open the switch. Switch 56 may be a normally closed switch in the circuit 57a, 57b (FIG. 9) for motor 41.

To lower the cable and accessories from the upper (FIG. 7) position to a lower (FIG. 8) position, (for repair or other purposes) a switch 58 may be pressed to initially close the circuit through a solenoid or other electrical mechanism 59 (FIGS. 9, 1 and 5) to retract the rod 31 from its edgewise (FIG. 7) position behind the first latch 28, whereupon the first latch 28 will be moved to the FIG. 8 position by the weight of the spindle 25 and accessories. The switch 58 may be a push button switch which is held by the operator momentarily or controlled through a relay or other mechanism so as to have a momentary action. The retracted rod 31 on release of the switch 58 is urged by the spring 32 against the first latch 28 (FIG. 8) and holds it in position for once again moving behind the first latch 28 on rotation of latch 28 by latch 30 to the FIG. 7 position on elevation of the parts. The switch 58 may be incorporated in a key switch 60 (FIG. 4) which may be of a tumbler type, broadly comparable to automobile ignition switches which close certain contacts on turning in one direction and others on turning in the other direction.

In the case of the key switch 60, as shown in FIG. 4, by turning the switch in the direction marked "lower" (to the right) the switch 58 would be closed on the first few degrees of such turn; upon the continued turning of the key in the keyway 61 to the right, the motor circuit would be closed through the wires 57c and 57d (FIG. 9) rotating the motor, and thus the drive shaft 40, for drum 21 in the direction to lower the cable 20. The user would turn the key back to neutral (off) position when the cable has been lowered to the desired point. The same result could be achieved with a push button switch arrangement, as will be readily apparent from the foregoing disclosure, or with a toggle switch; the barrel 62 of the lock 60 in FIG. 4 has the toggle switch action shown in FIG. 9. On turning the key to the left, the toggle switch portion of the lock (FIG. 9) 62a moves to the left closing on contacts 63 and 64, thereby reversing the motor through the series field 65, rotating the shaft 40 and thereby the drum 21 and elevating cable 20, moving the latch member 28 to the FIG. 7 position. The switch 62a may be a double-pull, double-throw toggle switch of any convenient form. The complementary latch 30 of spindle 25 engages the first latch 28 and rotates the latter from the FIG. 8 position to the (full lines) FIG. 7 position. The first latch 28 will thus rotate so that its edge will clear the rod 31, which will thereupon move past the edge of latch 28 and open the (FIG. 6) switch 56.

A single switch 62 (FIG. 4, 62; FIG. 9, 62a) may be used to control a plurality of circuits such as shown in FIG. 9 (as indicated by the numerals 67 in FIG. 4) for in turn controlling a plurality of cables 20 and associated parts where, for example, it is desired to control the raising and lowering of a plurality of units pursuant to the invention. This may be done by a control arrangement in such as shown in FIG. 4 wherein the master switch 68 on control panel 66 has circuits at the markings 67 thereon for a series of systems embodying the invention so that a plurality of such units may be controlled by operation of the master switch 68, as will be readily apparent to those skilled in this art. For example, switch 68 may connect individual motors and circuits for a series of systems (each with its cable, etc.) with switch 62 so that said switch 62 would control the desired circuit on turning the master switch 68 to the number 67 for the desired circuit.

An aligning member 70, having aligning slot 71 may be secured to casing 22. On elevation of the spindle 25 toward the FIG. 7 position, the latch member 30 or other spindle tab would enter the aligning slot 71 and (in a camming action) orient the spindle. In the final (FIG. 7) position of the spindle the contact 27 or other part of casing 26, could be returned to a preset or focused position. For that purpose, slot 71 and aligning member 70 could be substantially longer than shown in FIG. 7—for example, as shown in FIG. 3 of co-pending application, Serial No. 207,196.

While the foregoing disclosure of exemplary embodiments is made in accordance with the patent statutes, it is to be understood that the invention is not limited thereto or thereby, the inventive scope being defined in the appended claims.

We claim:

1. A hoisting device comprising a drum, a cable having a free end for supporting a load wound on the drum, an electric motor connected to the drum for rotating the drum to wind and unwind the cable to thereby raise and lower the load, and means for controlling the motor comprising a pair of switches, means for latching the cable in a preselected position and opening one of the switches, means for sequentially closing said one of the switches and unlatching the cable, and means for closing the second switch only after closing said one switch to energize the motor.

2. A device as defined in claim 1 wherein the means for latching the cable and opening said one of the switches comprises a first latch member pivotally mounted adjacent said one of the switches, a second latch member secured to the cable movable in a path to engage and pivot the first latch member, and a rod movable in a path intersecting the path of movement of the first latch member and into engagement with said one of said switches.

3. A device as defined in claim 1 wherein the means for sequentially closing said one of the switches and unlatching the cable comprises a solenoid connected to the rod and manually operable means for momentarily energizing the solenoid.

References Cited by the Examiner

UNITED STATES PATENTS

| | | | |
|---|---|---|---|
| 2,006,476 | 7/1935 | Payson | 254—187 |
| 2,463,394 | 3/1949 | King | 254—168 |
| 3,199,161 | 8/1965 | Hamilton | 24—132 |

FOREIGN PATENTS

| | | |
|---|---|---|
| 200,281 | 4/1906 | Germany. |
| 704,680 | 4/1941 | Germany. |
| 17,222 | 8/1902 | Great Britain. |
| 727,990 | 4/1955 | Great Britain. |

EVON C. BLUNK, *Primary Examiner.*

H. C. HORNSBY, *Assistant Examiner.*